(12) United States Patent
McKay et al.

(10) Patent No.: US 8,702,843 B2
(45) Date of Patent: Apr. 22, 2014

(54) PROCESS FOR REMOVING CONDENSABLE COMPONENTS FROM A FLUID

(76) Inventors: N. Wayne McKay, Calgary (CA); James Maddocks, Calgary (CA)

( * ) Notice: Subject to any disclaimer, the term of this patent is extended or adjusted under 35 U.S.C. 154(b) by 7 days.

(21) Appl. No.: 13/057,160

(22) PCT Filed: Jul. 12, 2010

(86) PCT No.: PCT/CA2010/001087
§ 371 (c)(1), (2), (4) Date: Mar. 30, 2011

(87) PCT Pub. No.: WO2011/006242
PCT Pub. Date: Jan. 20, 2011

(65) Prior Publication Data
US 2011/0167867 A1 Jul. 14, 2011

Related U.S. Application Data

(60) Provisional application No. 61/225,101, filed on Jul. 13, 2009.

(51) Int. Cl.
*B01D 53/00* (2006.01)
*F25J 3/00* (2006.01)

(52) U.S. Cl.
USPC ................................. 95/39; 62/617

(58) Field of Classification Search
USPC .......................... 95/39; 62/611, 617
See application file for complete search history.

(56) References Cited

U.S. PATENT DOCUMENTS

| | | | | |
|---|---|---|---|---|
| 4,617,039 A * | 10/1986 | Buck | | 62/621 |
| 4,854,955 A | 8/1989 | Campbell | | |
| 5,791,160 A * | 8/1998 | Mandler et al. | | 62/611 |
| 5,927,103 A * | 7/1999 | Howard | | 62/620 |
| 6,182,468 B1 | 2/2001 | Stothers | | |
| 6,301,927 B1 * | 10/2001 | Reddy | | 62/619 |
| 6,449,982 B1 * | 9/2002 | Fischer | | 62/613 |
| 7,910,787 B2 * | 3/2011 | Pawlak et al. | | 585/899 |
| 2004/0245182 A1* | 12/2004 | Appleford et al. | | 210/739 |

FOREIGN PATENT DOCUMENTS

| | | | | |
|---|---|---|---|---|
| WO | 2006032139 A1 | 3/2006 | | |
| WO | WO 2006032139 A1 * | 3/2006 | | C10G 7/00 |
| WO | 2009002174 A2 | 12/2008 | | |

* cited by examiner

*Primary Examiner* — Robert A Hopkins
(74) *Attorney, Agent, or Firm* — MBM Intellectual Property Law, LLP (57) ABSTRACT

A protocol for removing condensables from a fluid. The fluid, as an example an acid gas stream captured for EOR or CCS purposes, is initially treated to condense liquids with removal to form a gas stream. The latter is then compressed and cooled. At least a portion of this is then expanded, to form a cooled low pressure stream, and mixed with the initial fluid stream to augment cooling and condensation of condensable components.

10 Claims, 7 Drawing Sheets

PROCESS FOR REMOVING CONDENSABLE COMPONENTS FROM A FLUID

TECHNICAL FIELD

The present invention relates to the removal of condensables from fluid mixtures exhibiting a positive Joule-Thomson effect, and more particularly the present invention relates to the removal of, for example, water from acid gas streams, for minimizing or substantially eliminating the formation of liquid water therein so as to minimize corrosion and formation of hydrates in the gas stream, transported and injected for sequestration.

BACKGROUND ART

Gas streams, such as those which result from petroleum processing or combustion processes, often contain a gas or gases which form an acid when mixed with water. Such gases are typically called "acid gases". The most common naturally occurring acid gases resulting from petroleum processing are hydrogen sulfide ($H_2S$) and carbon dioxide ($CO_2$). Typical acid gases derived from combustion/oxidation/pyrolysis processes are carbon dioxide ($CO_2$), sulphur dioxide ($SO_2$), and nitrogen oxides ($NO$, $NO_2$).

Acid gases typically contain water. Naturally occurring acid gases are often saturated with water in the reservoir and combustion-derived gases co-exist with the water formed from the reaction of hydrogen and oxygen during combustion. Virtually all acid gases eventually end up being saturated with water vapour at some point during the process of removal or purification of the acid gas. Reducing the temperature or increasing the pressure, over a defined range, of an acid gas containing water, such as that which occurs when the acid gas is passed through a compressor, will result in the condensing of some of the water from a gas to a liquid phase. At some temperature, still above the freezing point of water, the water and acid gas may begin to form a "solid like" structure called a gas hydrate. The temperature at which hydrates may begin to form is called the Hydrate Formation Temperature (HFT) which varies according to the pressure, composition and water content of the mixture. Hydrates are the physical combination of water and small molecules producing a compound having an "ice like" appearance, but possessing different properties and structure than ice. Hydrates may also be known as gas clathrate. Hydrates are problematic as they can cause reduced heat transfer, excess pressure drops, blockages, interruptions in production and are a safety concern.

The formation of an aqueous phase in any gas system is undesirable as it promotes corrosion, can cause gas hydrates to form and can cause mechanical and operational problems. An aqueous phase is particularly undesirable in an acid gas system as the resulting aqueous phase will be acidic, resulting in a significant increase in the corrosion rate and usually resulting in a higher HFT than non-acid gases.

Table A illustrates the levels of corrosion which occur in mild steel at varying concentrations of acid gas components in water.

TABLE A

| Corrosion of Mild Steel by Carbon Dioxide and Other Gases in Water* | | | |
| --- | --- | --- | --- |
| $O_2$ conc. ppm | $H_2S$ conc. ppm | Corrosion mils/yr $CO_2$ conc, 200 ppm | Corrosion mils/yr $CO_2$ conc, 600 ppm |
| 8.8 | 0 | 28 | 60 |
| 4.3 | 0 | 18 | 44 |
| 1.6 | 0 | 12 | 34 |
| 0.4 | 0 | 17 | 27 |
| <0.5 | 35 | 6 | 6 |
| 0.5 | 150 | 15 | 16 |
| <0.5 | 400 | 17 | 21 |

*Temperature 80° F., exposure 72 hr.
Source: Data of Watkins and Kincheloe (1958) and Watkins and Wright (1953)

Although the discussion has focused on acid gas, it will be appreciated by those skilled that the methodology and concept is applicable for removing condensable components from any fluid stream exhibiting a positive Joule-Thomson coefficient.

SUMMARY OF THE INVENTION

One object of one embodiment of the present invention is to provide an improved protocol for the removal of condensable components from a fluid with a positive Joule-Thomson coefficient containing condensable components.

A further object of one embodiment of the invention is to provide a method for removing condensable components from a fluid containing said condensable components, comprising:

providing a fluid mixture with a positive Joule-Thomson coefficient containing condensable components as an initial feed stream;

treating said initial feed stream to condense liquids there from and removing said liquids to form a gas stream;

compressing and cooling said gas stream to form a high pressure stream;

expanding at least a portion of said high pressure stream to form a cooled low pressure stream; and mixing said cooled low pressure stream with said initial feed stream to augment cooling and condensation of condensable components in said initial feed stream.

Yet another object of one embodiment is to provide an apparatus for removing condensable components from a fluid with a positive Joule-Thomson coefficient containing said condensable components, comprising:

condensing means for treating a fluid mixture with a positive Joule-Thomson coefficient containing condensable components as the initial feed stream to liquids there from and removing said liquids to form a gas stream;

compressor means and after-cooling means for said gas stream to form a high pressure stream;

an expansion circuit for expanding at least a portion of said high pressure stream to form a cooled low pressure stream;

a recycle circuit in fluid communication with said expansion circuit for mixing said cooled low pressure stream with said initial feed stream to augment cooling and condensation of condensable components in said initial feed stream.

A still further object of our embodiment of the present invention is to provide a system for preventing gas hydrate formation in a gas containing condensable water during removal of said condensable water, comprising:

a treatment stage, comprising:

fluid stream with a positive Joule-Thomson coefficient containing condensable water;

separator means in fluid communication with said fluid stream for separating liquid containing condensed water from said fluid stream to form a partially dehydrated gas stream;

compressor means and after-cooler means for compressing and cooling said partially dehydrated gas stream evolving from said separator means;

outlet means for discharging a partially dehydrated gas stream;

an expansion means circuit for expanding and cooling a gas stream;

said circuit positioned to recycle a portion of said partially dehydrated gas stream through said expansion means to said treatment stage.

Figure 1:
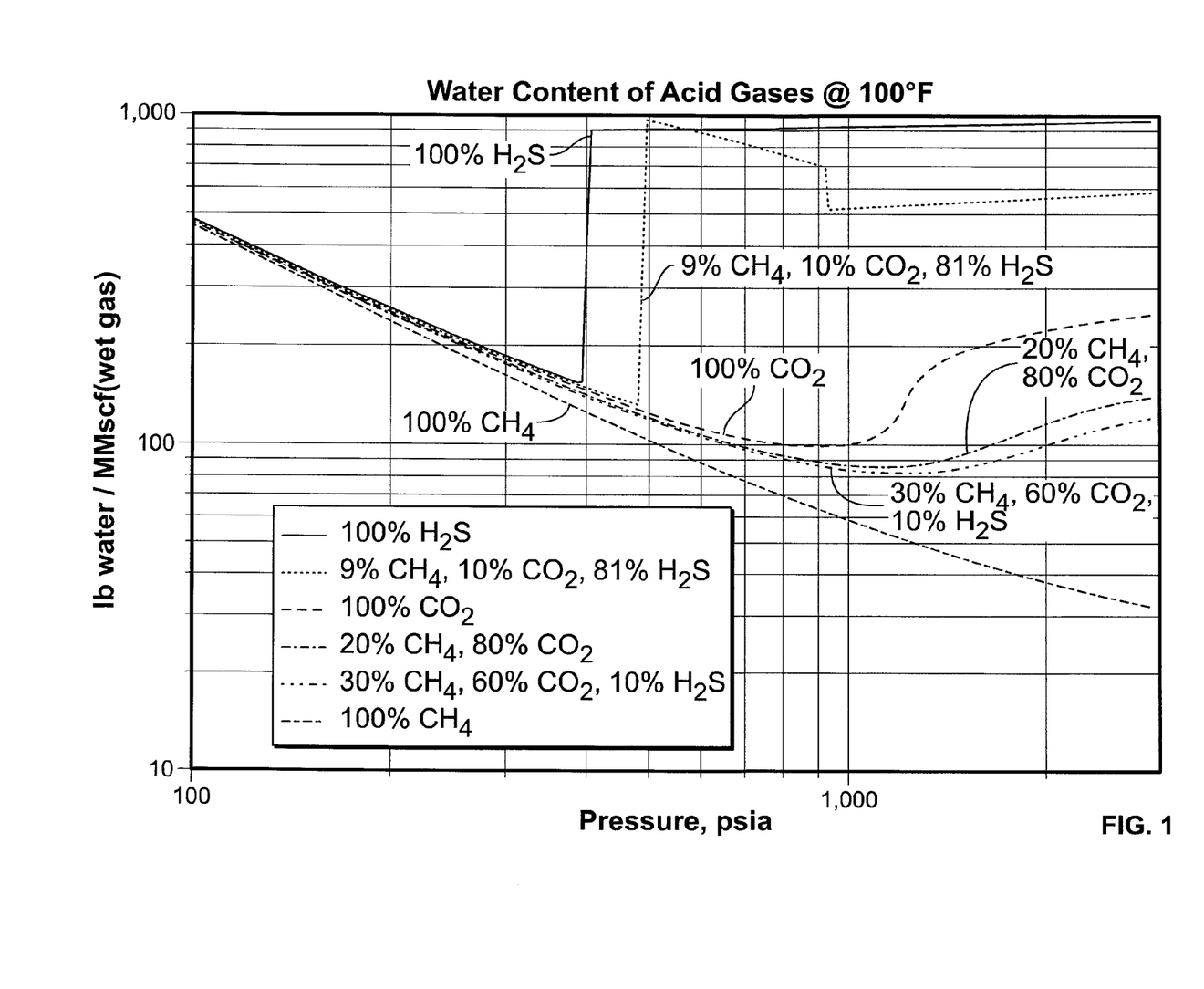
FIG. 1 is a graphical illustration of the saturated water content of various fluids, acid gases and methane ($CH_4$) at 100° F. over a range of pressures.
Figure 2:
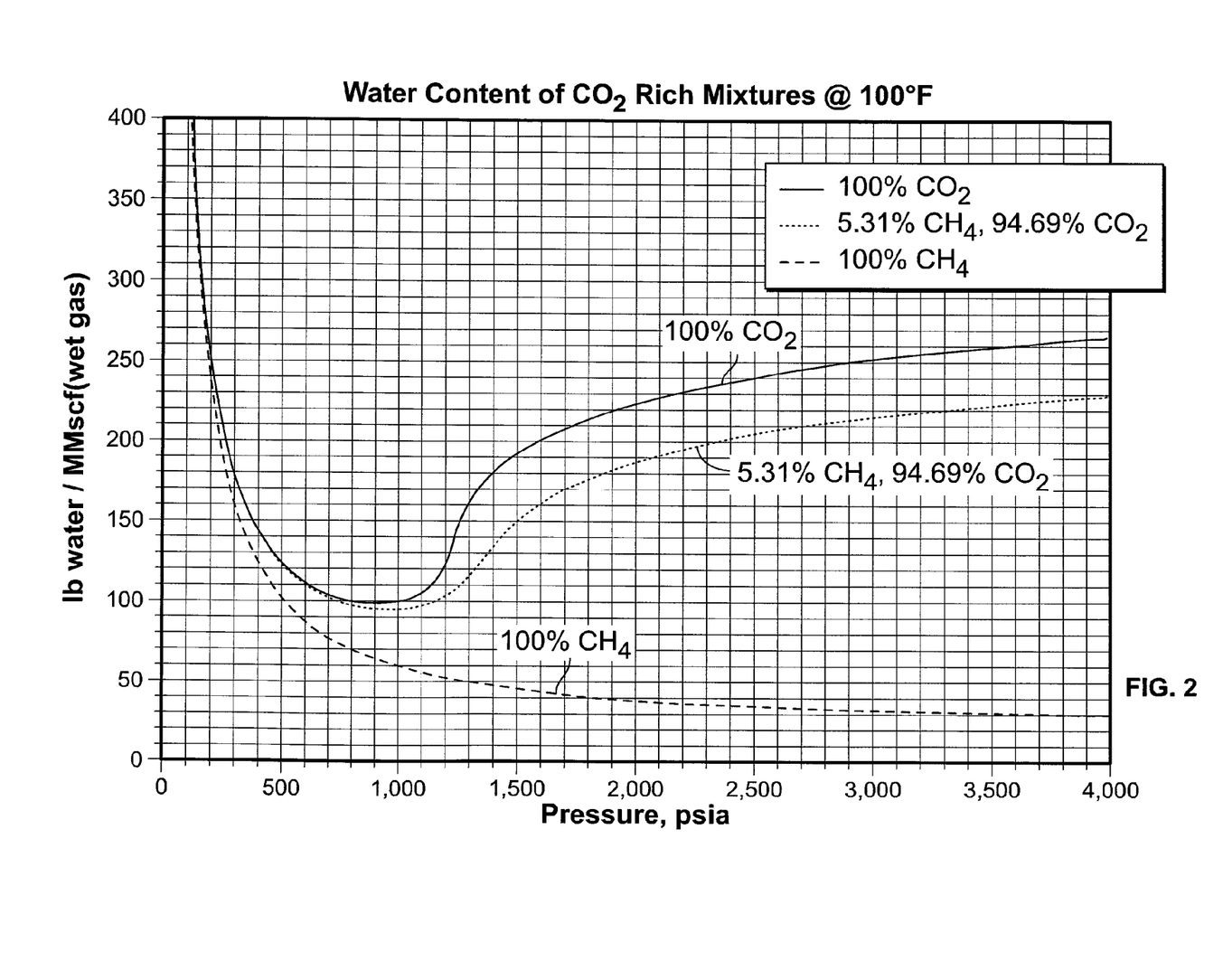
FIG. 2 is a graphical illustration of the saturated water content of $CO_2$-rich mixtures and methane ($CH_4$) at 100° F. over a range of pressures.
Figure 3:
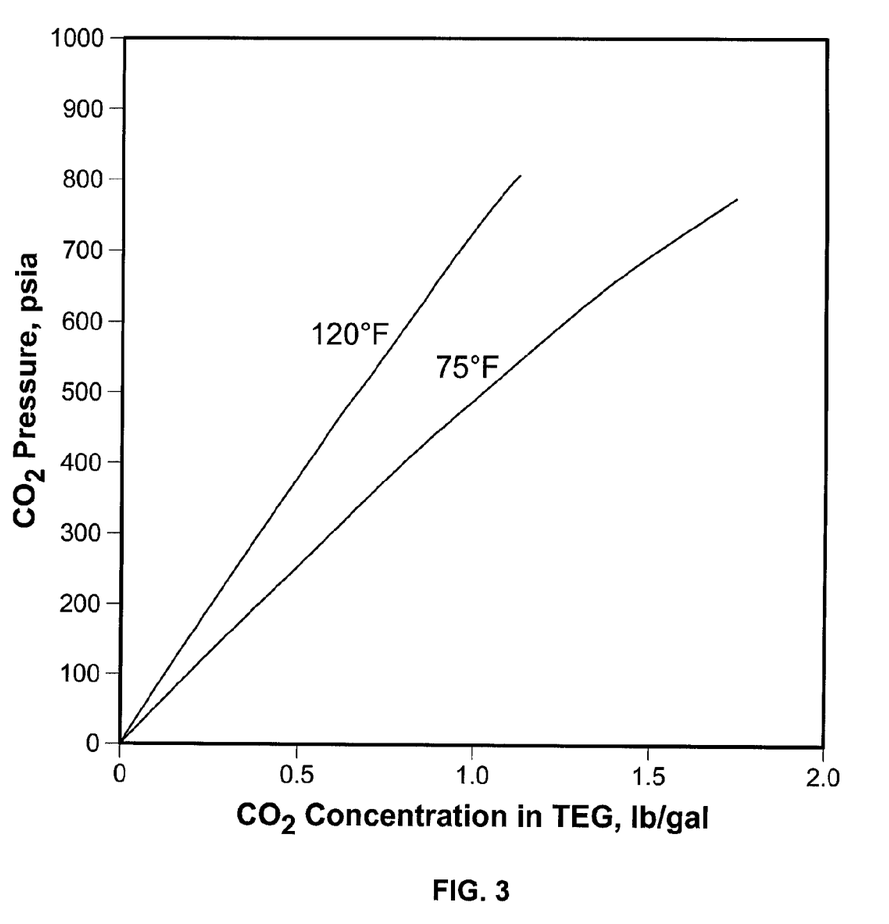
FIG. 3 is a graphical illustration of the glycol losses in a prior art high pressure $CO_2$ service.

Having reference to FIGS. 1 and 2, water content in an acid gas is proportional to temperature and up to about 400 psia for $H_2S$ and 900 psia for $CO_2$, is inversely proportional to pressure. Within these limits, higher pressures and lower temperatures favor low water content in acid gases.

Dehydration is the process of removing water so as to minimize or prevent hydrate and free water formation. In an acid gas with a relatively high $H_2S$ concentration, sufficient water is typically removed during cooling between stages of conventional multi-stage compression through to dense phase (some pressure above the critical pressure of the fluid) such that a separate dehydration process is not required. As the $CO_2$ content of the acid gas increases, sufficient water removal through compression alone becomes less likely and a separate dehydration process is usually required.

Conventional means of gas dehydration are solid desiccant adsorption, liquid desiccant absorption, refrigeration, membrane separation, and dry gas stripping. The most commonly used methods are solid desiccant adsorption and liquid desiccant absorption.

Glycol dehydration, a liquid desiccant absorption process, is generally regarded as the favored operational and most economical for most applications. Such liquid desiccant dehydration processes have several drawbacks:

glycol losses in a high pressure $CO_2$ service can be significant;

excess oxygen, typically found in combustion-formed acid gases significantly increases corrosion and accelerates the degradation of the glycol at higher regeneration temperatures, necessitating the addition of continuous glycol reclamation;

dehydration equipment must be manufactured from high cost, corrosion resistant metals such as stainless steel to handle the acidic liquids produced;

glycol is typically heated to 400° F. for regeneration resulting in vapourizing of water and venting to atmosphere of any other contaminants also absorbed by the glycol, such as volatile organic compounds (VOC's), typically benzene, toluene, ethyl benzene and xylene (BTEX) and any stripping gases. Control of these fugitive emissions generally requires the addition of costly vapour recovery equipment and introduces the potential for further oxygen contamination;

utility requirements of such processes are high and include the fuel used for glycol regeneration and the power required to pump the glycol and operate the vapour recovery equipment;

significant total carbon footprint is generated as a result of the manufacturing of the dehydration equipment, and the $CO_2$ produced from the utility demands of the system and of the formulation of the glycol used in the dehydration process.

Dehydration by refrigeration makes use of a gas's reduced ability to hold water as it's temperature is decreased. Temperature reduction can be achieved indirectly by heat exchange from external 'refrigeration' or other temperature reduction process, or directly by expansion of the gas itself. Direct expansion of the gas is either isentropic expansion such as in a turbo-expander or isenthalpic expansion, such as through a Joule-Thomson (JT) valve used in a conventional choke plant or through a gas compression refrigeration process. Installing a dedicated indirect refrigeration unit solely for the purpose of dehydration is typically cost prohibitive.

Both direct isenthalpic and isentropic refrigeration dehydration methods utilize an expansion device, a low temperature separator and at least one heat exchanger to recover as much energy from the process as possible. In their simplest form, the entirety of the gas is expanded, either isenthalpically or isentropically, from a higher pressure to a lower pressure, resulting in a fluid temperature low enough for water condensation to occur. The condensed water is removed from the process in a low temperature separator and the residual low temperature, substantially dry gas is used to pre-cool incoming fluid to improve the thermal efficiency of the process.

In the isentropic expansion case, expansion is accomplished with an expander and the work extracted by the expander is typically used to partially recompress the outlet dry gas.

The choice of whether to use isentropic or isenthalpic expansion is dependant upon the amount of water removal required, and therefore the amount of temperature reduction required. Isentropic expansion is capable of achieving lower temperatures. From a capital cost perspective, the isentropic process is significantly more costly, but the ability to recover work has an offsetting advantage. From an operation and maintenance perspective, the isenthalpic process has an advantage of being mechanically and operationally simple and suitable for most applications. The offsetting disadvantage of the isenthalpic process is the requirement to consume additional work through increased compression requirements.

The common drawback of any of the refrigeration dehydration processes is that most applications require the gas stream to be cooled to a temperature that is near or below the HFT to achieve the desired level of dehydration. For reliable operation, continuous addition of a thermodynamic hydrate inhibitor, such as glycol or methanol, is usually required to lower the hydrate formation temperature. If desired, both glycol and methanol are recoverable but require a separate regeneration process complete with all of the issues discussed earlier under liquid desiccant dehydration. Often the choice is made to use methanol without recovery as methanol is relatively benign and has less impact on downstream processes than glycol.

Clearly there is a need for a dehydration process for acid gas streams that is efficient and cost effective and which avoids the problems noted with conventional dehydration processes.

BRIEF DESCRIPTION OF THE DRAWINGS

The features of the invention will become more apparent in the following detailed description in which reference is made to the appended drawings wherein.

Similar numerals used in the Figures denote similar elements.

BEST MODE FOR CARRYING OUT THE INVENTION

Embodiments of the invention take advantage of the thermodynamic property of typical acid gases that make them useful as a 'refrigerant'. Such gases exhibit a relatively large temperature reduction for a given pressure reduction within the operating region of the process. The large decrease in temperature is used to cool a slipstream of the feed stream which is thereafter recycled upstream for cooling the feed stream. In this manner, the method uses recycling to "auto-refrigerate". The Joule-Thomson effect is achieved by allowing the gas to expand isenthalpically through a throttling device, typically a control. No external work is extracted from the gas during the isenthalpic expansion. The rate of change of temperature with respect to pressure in a Joule-Thomson process is the Joule-Thomson (Kelvin) coefficient. For example, the Joule-Thomson (JT) Coefficient for carbon dioxide at 50° C. and 60 atm. is about 5.6 times greater than that of nitrogen at the same conditions. Therefore the temperature reduction for $CO_2$ would be about 5.6 times greater than for nitrogen for the same reduction in pressure at these conditions. JT Coefficient data is also available for $H_2S$ and $SO_2$.

Acid gases processed for commercial applications, such as Enhanced Oil Recovery (EOR) applications, or Carbon Capture and Sequestration (CCS) applications are normally compressed to super-critical pressures, commonly referred to as "dense phase", for transportation and/or sequestration. To reach dense phase, compression is normally accomplished in more than one stage, whether utilizing centrifugal, reciprocating, or shock compression, depending upon the initial pressure. The pressure differential between stages provides an opportunity to take advantage of the favourable JT Coefficient properties of the vapour.

Compression is broken into two distinct regions with respect to the critical point of the fluid being compressed. The stages of compression in the first region are sub-critical and the stages in the second region take the fluid above it's critical pressure. An inlet stream enters the first region of compression, which is sub-critical, and is assumed to be water saturated. Some water is naturally removed by compression through the various stages in the first region.

In embodiments of the invention, a slipstream of fluid from the after-cooled discharge of one stage of compression, typically near or above critical pressure, is expanded to the suction pressure of that same stage, or to a preceding stage should additional temperature reduction be required. The resulting reduced temperature of the expanded slip stream is used to cool the upstream main fluid stream, firstly by heat exchange, if required, and finally by direct mixing of the slipstream with the main fluid stream. The resulting reduction in temperature of the mixed stream condenses additional water from the gas. The amount of cooling required is a function of the minimum water content required for the stream composition to meet the design criteria for water dew point temperature and/or hydrate formation temperature.

The following are examples illustrating embodiments of the invention, more particularly Example 1—a basic embodiment;

Example 2—utilizing a low temperature separator vessel (LTS); Example 3—incorporating a heat exchanger (HEX);

Example 4—a multi-stage isenthalpic embodiment; and Example 5—a multi-stage isentropic and isenthalpic embodiment.

Examples 1-3 are shown using different stream compositions; more particularly a stream having 100% $CO_2$ and a stream having 80% $CO_2$ and 20% $H_2S$. It will be noted however that embodiments of the invention are applicable to streams having varying amounts of $H_2S$ and including $SO_2$, $NO_x$ and any other gaseous mixtures with relatively large JT Coefficients.

Examples 4 and 5 illustrate the low temperature capabilities of embodiments of the invention as well as the differences between isenthalpic and isentropic processes.

Example 1

Basic

Figure 4A:
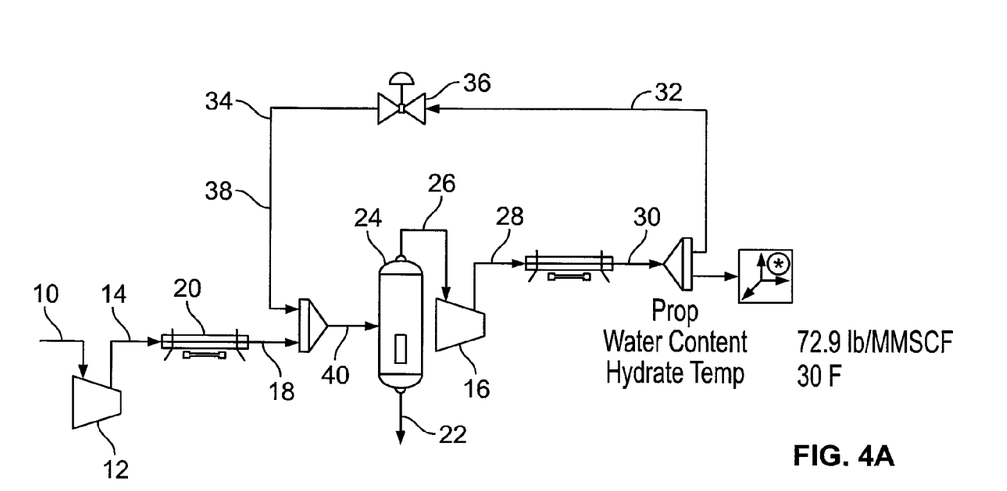
FIG. 4A is a schematic of an isenthalpic dehydration process according to an embodiment of the invention for a water saturated fluid stream comprising 100% $CO_2$.
Figure 4B:
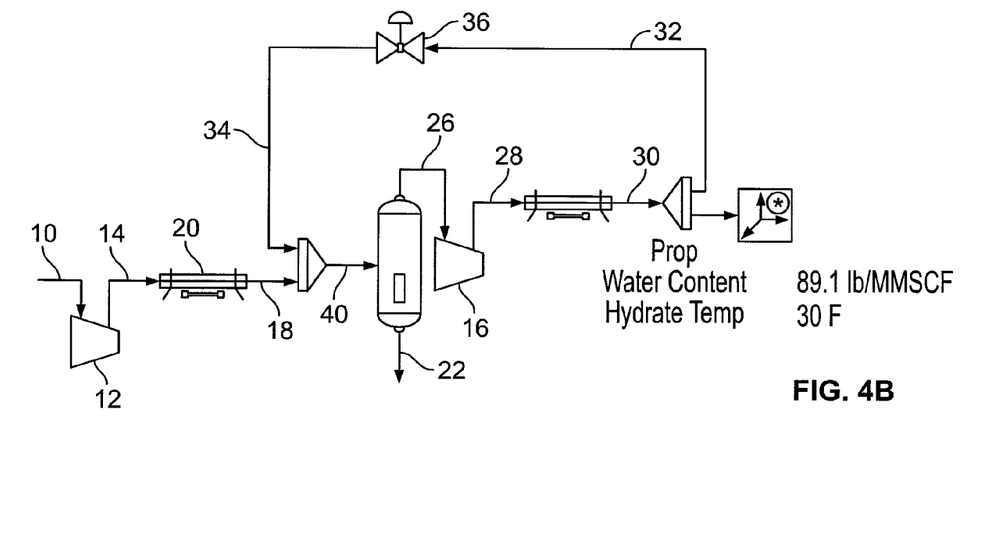
FIG. 4B is a schematic of an isenthalpic dehydration process according to FIG. 4A for a fluid stream comprising 80% $CO_2$ and 20% $H_2S$.

Having reference to FIGS. 4A and 4B, in an embodiment of the invention, a water saturated acid gas feed stream 10 enters a suction stage 12 where it is compressed 14 to the suction pressure of the next stage 16. The hot compressed vapour 14 is cooled 18 with an after-cooler 20 resulting in the condensation of some of the water and other condensables in the feed stream. The condensed liquid containing water is removed 22 in a separator 24 upstream of the final stage of compression. The saturated gas 26 from the separator 24 is further compressed at 28 and is after-cooled again at 30.

A slipstream 32 from the compressed and after-cooled fluid stream is removed and isenthalpically expanded 34 across a Joule-Thomson valve (TCV) 36 to the lower suction pressure of the same stage 16 of compression. The expansion results in a temperature reduction, the magnitude of which is dependent upon the magnitude of the pressure reduction and the composition of the fluid stream. The colder stream 38 is combined with the after-cooled stream 18, exiting the previous stage of compression, resulting in a combined stream 40 having a temperature reduced sufficiently to condense the required amount of water.

As shown in FIG. 4A for a feed stream having 100% $CO_2$, the temperature is reduced to about 87° F. and the final water content is reduced to about 73 lb/MMscf to result in a hydrate formation temperature (HFT) of 30° F.

Referring to FIG. 4B, wherein the feed stream contained 80% $CO_2$ and 20% $H_2S$, the temperature need only be reduced to about 93° F. for a final water content of about 89 lb/MMscf to achieve the same hydrate formation temperature (HFT) of 30° F.

Example 2

Heat Exchanger (HEX)

In cases where the composition of the feed stream, in combination with a large pressure reduction, creates a stream temperature which is below the hydrate formation temperature of the main undehydrated feed stream, the embodiment shown in FIGS. 4A and 4B can be modified to include a heat exchanger (HEX).

Figure 5A:
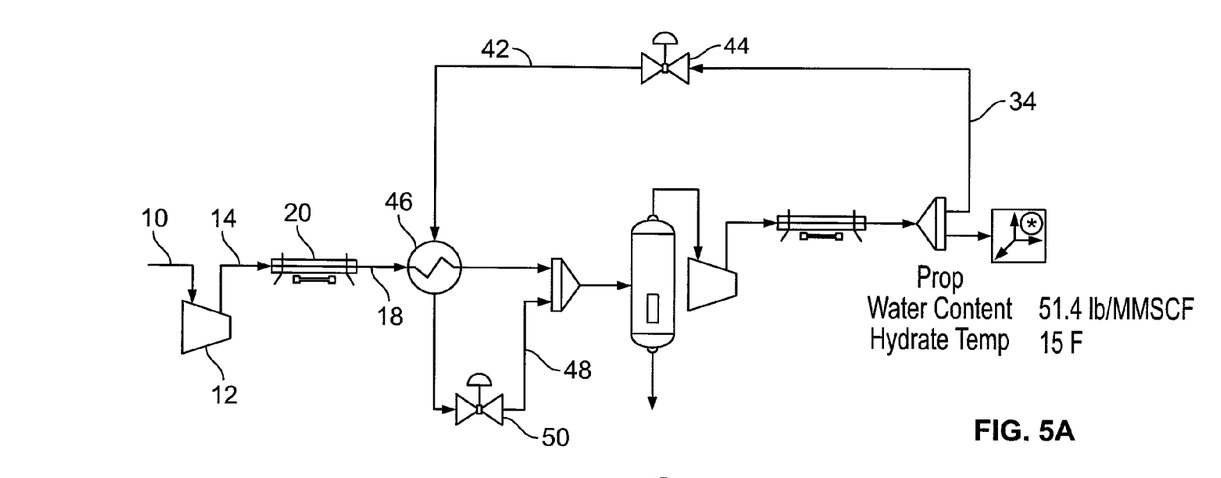
FIGS. 5A and 5B are schematics of an isenthalpic dehydration process according to FIGS. 4A and 4B incorporating a heat exchanger for heating a partially expanded slipstream for preventing hydrate formation in the main process feed stream prior to further expansion of the slipstream to achieve the desired temperature reduction.
Figure 5B:
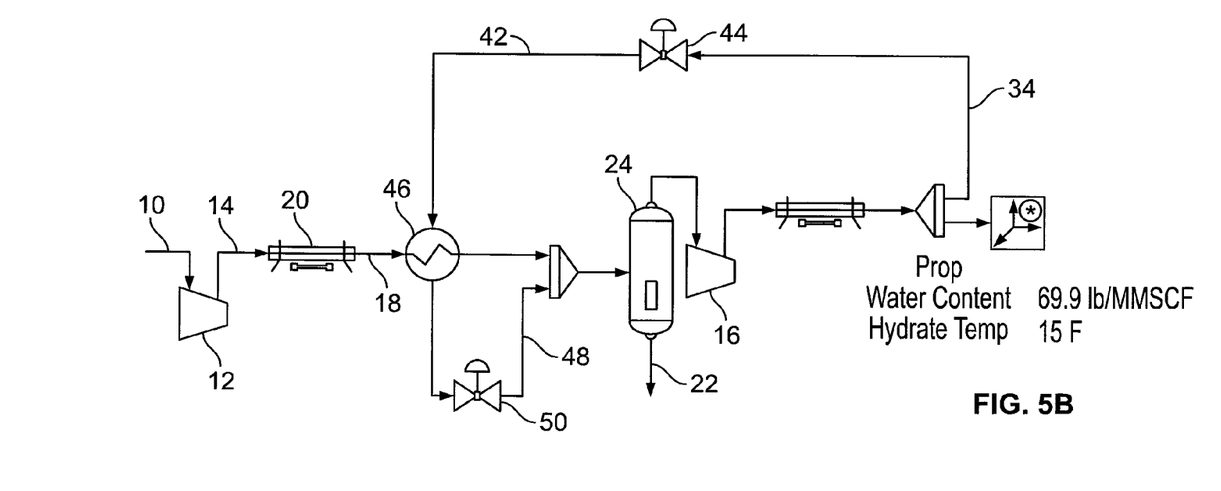

In reference to FIGS. 5A and 5B, the basic embodiment is modified so as to avoid the need for continuous injection of hydrate inhibitor, as is utilized in conventional refrigeration processes.

In FIGS. 5A and 5B, the slipstream 34 is partially expanded 42 across a second Joule-Thomson Valve (JTV) 44. The temperature of the partially expanded stream is thereafter raised in a heat exchanger 46 prior to further expansion of the stream 48 across the Joule-Thomson Valve (TCV) 50. Thus, the temperatures of the partially and fully expanded streams 42, 48 are maintained above the respective hydrate formation temperatures of the main undehydrated feed stream.

For the purposes of Example 2, the design hydrate formation temperature was set at 15° F.

As shown in FIG. 5A, for a feed stream having 100% $CO_2$, the temperature must be reduced to about 73° F. to result in a final water content of about 51 lb/MMscf to achieve the design hydrate formation temperature of 15° F.

With reference to FIG. 5B, and in the case where the feed stream comprises 80% $CO_2$ and 20% $H_2S$, the temperature was reduced to about 79° F. to result in a final water content of about 64 lb/MMscf to achieve the design hydrate formation temperature of 15° F.

Example 3

Low Temperature Separator (LTS)

Figure 6A:
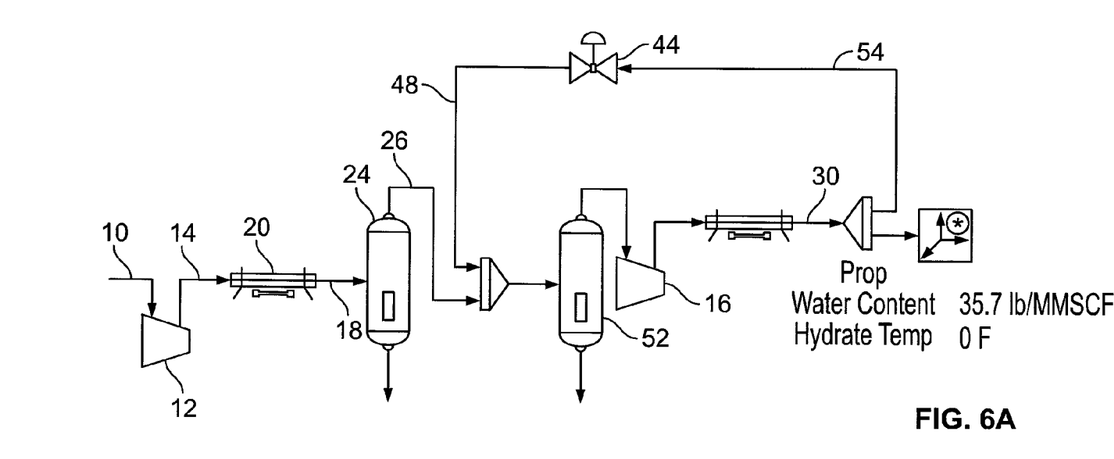
FIGS. 6A and 6B are schematics of an isenthalpic dehydration process according to FIGS. 4A and 4B, incorporating a low temperature separator for removing water from the fluid stream prior to the reintroduction of the slipstream thereto and continuous hydrate inhibitor injection.
Figure 6B:
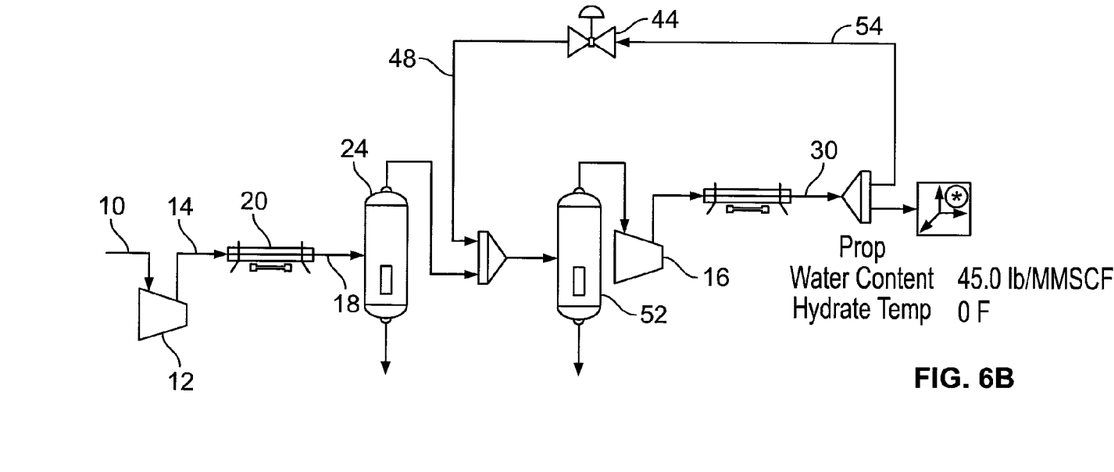

Referring to FIGS. 6A and 6B, an embodiment of the invention utilizes an additional separator where temperature reduction is significant, as an alternate to the embodiment described in Example 2.

As shown in FIGS. 6A and 6B, the 46 and JTV 44 of FIGS. 5A and 5B are replaced with a second low temperature separator (LTS) 52. A slipstream 54 is expanded 56 across a Joule-Thomson Valve (TCV) 44. The first separator 24 is positioned to remove as much water as possible from the feed stream prior to the reintroduction of the expanded slipstream 48. The addition of hydrate inhibitor into the expanded slipstream 48 is considered when the process design requires that the temperature of the expanded slipstream be below 32° F. The early removal of the water reduces the amount of cooling required to meet the design conditions and, should conditions warrant, reduces the amount of hydrate inhibitor required.

The design hydrate formation temperature for Example 3 was set at 0° F.

As shown in FIG. 6A, where the feed stream comprises 100% $CO_2$, the temperature had to be reduced to 62° F. to result in a final water content of about 36 lb/MMscf to meet the design hydrate formation temperature of 0° F.

With reference to FIG. 6B, where the feed stream comprises 80% $CO_2$ and 20% $H_2S$, the temperature had to be reduced to about 67° F. to result in a final water content of about 45 lb/MMscf to achieve the design hydrate formation temperature of 0° F.

Example 4

Multi-Stage Isenthalpic

Figure 7:
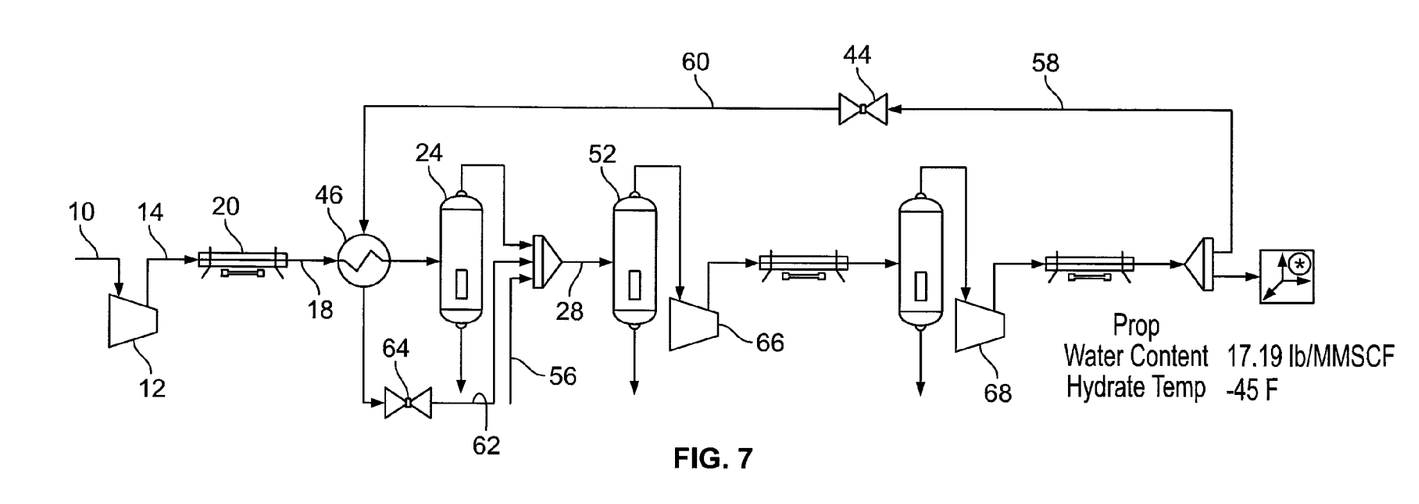
FIG. 7 is a schematic of a multi-stage isenthalpic process according to an embodiment of the invention.

In reference to FIG. 7, a multi-stage embodiment of the invention is employed where the required temperature reduction is very large. The embodiment was designed to achieve a hydrate formation temperature of −45° F.

As shown in FIG. 7, this embodiment comprises a heat exchanger 46, a low temperature separator 52 and continuous hydrate inhibitor injection 56. The first separator 24 is positioned between the heat exchanger 46 and the reintroduction of the temperature reduced stream. The early removal of water from the feed stream reduces the amount of cooling and hydrate inhibitor required to meet the design criteria.

To obtain a lower temperature, the pressure reduction which results from the expansion of the slipstream 58 through the Joule-Thomson Valve 44 occurs over at least two stages of compression. Thus, the partially expanded slipstream 60 is heated at the heat exchanger 46 and fully expanded 62 through the Joule-Thomson Valve 64 to be reintroduced, along with the injection of hydrate inhibitor, to the feed stream two or more stages 66, 68 upstream from the removal of the slipstream 58 for cooling the feed stream 28. Condensed water is removed from the cooled feed stream 28 at the second separator 52 prior to further compression of the cooled feed stream 28.

In this example, the low temperature achieved at the fully expanded slipstream 56 and the cooled feed stream 28 necessitates the addition of the hydrate inhibitor, however the amount of hydrate inhibitor is minimized as a result of the upstream removal of a significant portion of water at the first separator 24.

An additional benefit of the low temperature achieved at the cooled feed stream in this example, is the ability to reduce the number of compression stages from five stages to four stages, resulting in a reduction in the overall cost.

Example 5

Multi-Stage Isentropic

Figure 8:
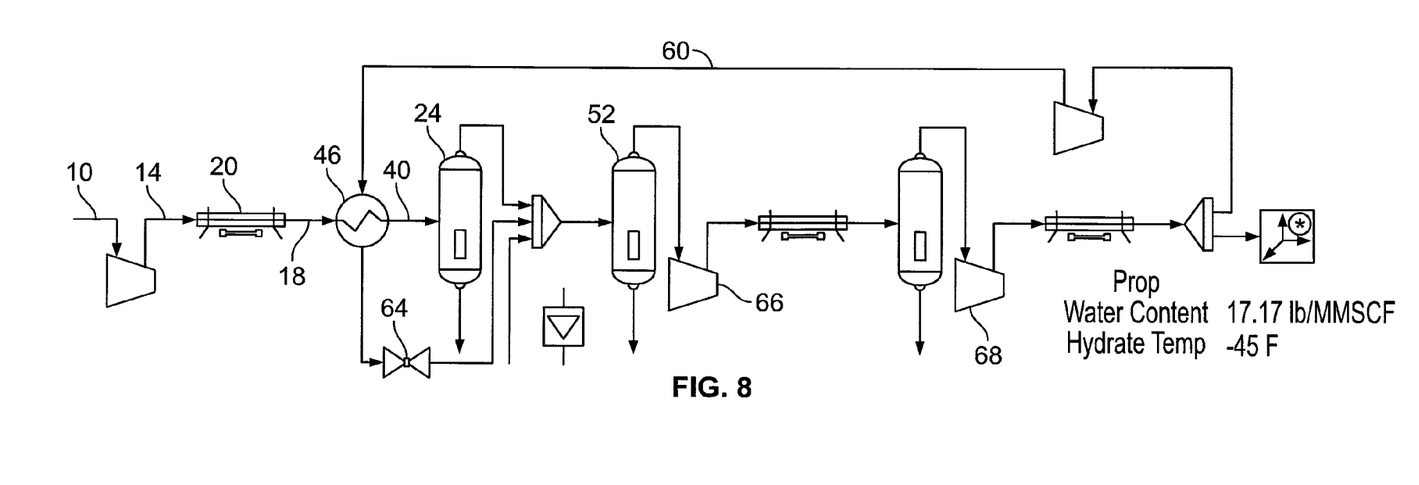
FIG. 8 is a schematic of a multi-stage isentropic process according to an embodiment of the invention wherein one of the Joule-Thomson valves is replaced with an isentropic fluid expander.

With reference to FIG. 8, a multi-stage embodiment of the invention utilizes an isentropic fluid expander 66, such as a conventional radial-expansion turbine or turbo-expander (such as is available from Mafi-Trench, Santa Maria, Calif., USA) to replace the Joule-Thomson Valve 44 of FIG. 7 for expansion of the slipstream 58.

In this embodiment, the isentropic fluid expander is capable of achieving a lower temperature in the expanded slipstream 60 than is possible using a Joule-Thompson valve (isenthalpic expansion) for the same reduction in pressure. Additionally, the slipstream fraction required is smaller than it is in Example 4.

The power requirements for Stage 3 (66) and Stage 4 (68) for this embodiment, compared to that in Example 4, are lower by about 2%. The isentropic fluid expander produces power, about 1.8% of Stage 3 (66) and Stage 4 (68) for other uses. Further, the hydrate inhibitor requirements are minimized.

The embodiments of the invention, described herein have notable advantages over and differences from conventional liquid desiccant and isenthalpic refrigeration dehydration processes.

In comparison to liquid desiccant dehydration processes, embodiments of the invention permit elimination of conventional dehydration equipment by replacement with the expansion valves (TCV, JTV) at a small fraction of the capital cost of the conventional dehydration equipment.

In comparison to conventional isenthalpic expansion refrigeration processes, such as a choke plant, embodiments of the invention may permit elimination of one stage of compression, a main gas-gas heat exchanger and the addition of hydrate inhibitor, providing a significant reduction to the capital cost.

The prior art choke plant requires that the entire gas stream be over-compressed and expanded to the design pressure. This typically increases the original compression power requirements of the system by 20% to 25%. Depending upon the composition of the gas and the operating conditions, the higher compressor discharge pressure may necessitate the addition of an entire stage of compression.

The cooling slipstream is typically 10% to 20% of the combined stream flow through a single stage, depending upon the composition of the acid gas and the required operating conditions. The increase in throughput through one stage of compression theoretically increases the total compression power demand by 2% to 4% (i.e. ⅕ of 10%-20% for a 5 stage compressor). In comparison however, this increase is often comparable to the increase due to the pressure drop through conventional dehydration equipment. Further, there is an efficiency improvement, and therefore a corresponding reduction in compression power, resulting from the reduced operating temperature of the compressor. In some instances, the compression power requirements end up being less than when using conventional dehydration equipment.

Lower suction temperatures, enabled by embodiments of the invention, have an additional advantage over both the conventional dehydrator and the choke plant. The reduced temperature in one stage provides the opportunity to rebalance the compression ratios on each stage, a higher compression ratio where the suction pressure is cooler thus enabling a reduction of the compression ratio in the others, until the discharge temperatures of each stage are relatively equal at some new lower value. The reduction in discharge temperature somewhat reduces the additional power demand arising from the additional slipstream volume seen in one or more stages of compression. The temperature reduction also results in longer valve life, increased operational time and lower maintenance costs. The rebalancing can, at some point, with lower temperatures, be significant enough to eliminate an entire stage of compression and thus provide considerable capital cost saving.

It is believed that the overall carbon footprint of embodiments of the invention is significantly lower than conventional methods. The requirement for equipment is considerably smaller reducing demand for manufacture, there is no need for the formulation of glycol and no additional utilities are required that produce $CO_2$, all of which more than offset the marginal increase in power required (typically about 2%) to compress the slipstream volume. Additionally, the lack of chemical requirements in embodiments of the invention significantly reduces ecological risk.

Acid gases including $CO_2$, $H_2S$, $SO_2$, and $NO_x$ are fluids well suited to the embodiments of the invention. It is believed however that the fluids are not limited to those disclosed herein. It is further believed that the thermodynamic principles utilized in embodiments of the invention are valid for all fluid mixtures exhibiting a positive Joule-Thomson (JT) Coefficent within the desired range of process conditions; in other words, the fluid mixtures cool when expanded. As a generalization, a fluid with a larger JT Coefficient will get colder than one with a smaller JT Coefficient and therefore will require less of the fluid to be slipstreamed. A low slip stream requirement is economically desirable.

Applications for embodiments of the invention lie in carbon capture and storage (CCS), the treatment of $CO_2$, $SO_2$, and $NO_x$ captured from combustion, gasification and industrial chemical processes for sequestration, and in AGI (acid gas injection) where $H_2S$ and $CO_2$ are captured from oil and gas processes for sequestration.

Examples 1-5 provided herein are based upon a single set of conditions. Embodiments of the invention require optimization for each fluid and set of conditions. Optimization involves the selection of the stage of compression best suited for initiation of the slipstream and which is best suited for recombining the slipstream. Another optimization lies in the selection of the optimum variation of the process whether it be Basic, HEX, LTS, Multi-Stage, Multi-Stage Isentropic, or some other combination of those described above. Also within any of the choices, the optimum instrumentation and control system needs to be included and the optimum operating points for the application established.

The examples provided assume steady state performance. Other considerations are addressed to accommodate start up, in service upsets, and shut down for commercial operations. One simple example is that during the first few minutes of start up, and during periods of external process upsets, the temperatures and slipstream flow rates may not be at the steady state operating condition dictated by the process design. Hydrates could potentially start forming without the provision of something in the design to mitigate this condition. Embodiments of the invention are therefore designed to include the capability of adding a thermodynamic hydrate inhibitor, such as methanol, for temporary protection against hydrate formation in an unsteady state performance.

The invention claimed is:

1. A method for removing condensable components from a fluid containing said condensable components, comprising:
   providing a fluid mixture containing condensable components as an initial feed stream, said stream including acid gases;
   treating said initial feed stream to condense liquids there from and removing said liquids to form a gas stream;
   compressing and after-cooling said gas stream to form a high pressure stream;
   expanding at least a portion of said high pressure stream to form a cooled low pressure stream and mixing said cooled low pressure stream with said initial feed stream to augment cooling and condensation of condensable components in said initial feed stream, said treating of said initial feed stream includes cooling with said cooled low pressure.

2. The method as set forth in claim 1, wherein the fluid has a positive Joule-Thomson coefficient.

3. The method as set forth in claim 1, wherein said condensable components include water.

4. The method as set forth in claim 1, wherein said condensable components include lower alkanes.

5. The method as set forth in claim 1, wherein said treating includes contact with heat exchanger means.

6. The method as set forth in claim 1, wherein said wherein said fluid is expanded isentropically.

7. The method as set forth in claim 1, wherein said wherein said fluid is expanded isenthalpically.

8. The method as set forth in claim 2, wherein condensed liquid is removed using a low temperature separator.

9. The method as set forth in claim 1, further including an optional step of adding hydrate inhibitor to said fluid.

10. The method as set forth in claim 4, wherein said feed stream containing acid gases is saturated with water.

* * * * *

UNITED STATES PATENT AND TRADEMARK OFFICE
CERTIFICATE OF CORRECTION

PATENT NO. : 8,702,843 B2  
APPLICATION NO. : 13/057160  
DATED : April 22, 2014  
INVENTOR(S) : N. Wayne McKay and James Maddocks It is certified that error appears in the above-identified patent and that said Letters Patent is hereby corrected as shown below:

In the Claims:

Column 10, line 53, insert the word --stream-- between "pressure" and ".".

Column 10, lines 62 and 63, delete the second occurrence of "wherein said".

Column 10, lines 64 and 65, delete the second occurrence of "wherein said".

Signed and Sealed this
Thirtieth Day of December, 2014

Michelle K. Lee
*Deputy Director of the United States Patent and Trademark Office*